Dec. 2, 1969  C. HORBERG, JR  3,481,516
HOSIERY BOARDING APPARATUS
Filed Jan. 31, 1968  12 Sheets-Sheet 2

Dec. 2, 1969  C. HORBERG, JR  3,481,516
HOSIERY BOARDING APPARATUS
Filed Jan. 31, 1968  12 Sheets-Sheet 3

Dec. 2, 1969  C. HORBERG, JR  3,481,516
HOSIERY BOARDING APPARATUS
Filed Jan. 31, 1968  12 Sheets-Sheet 4
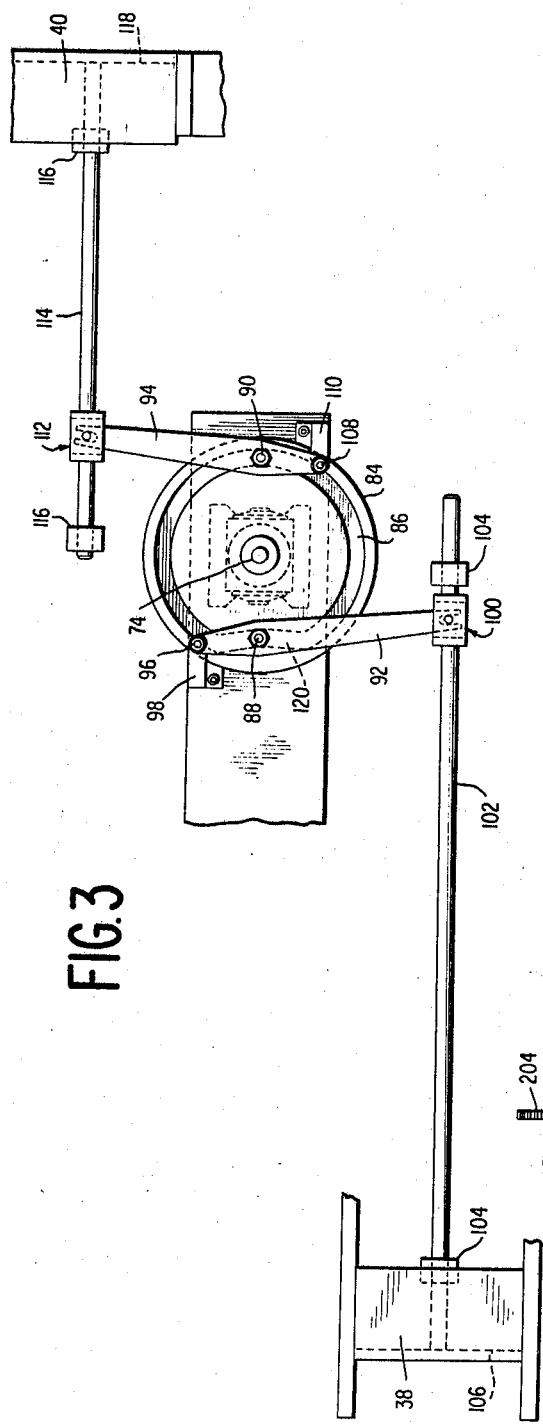
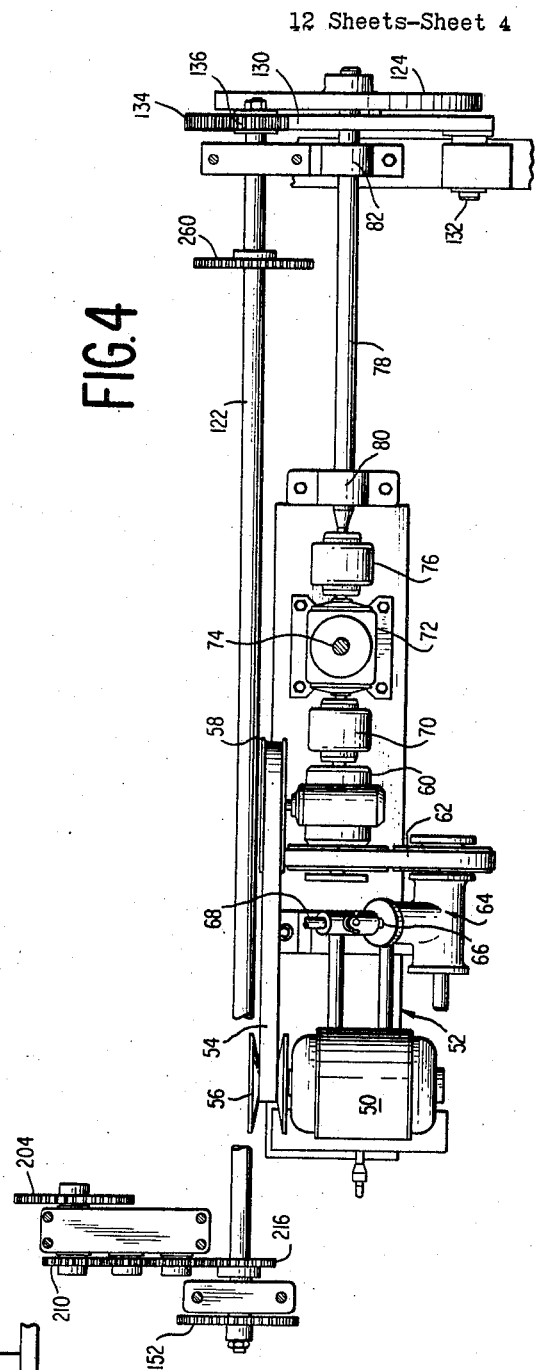

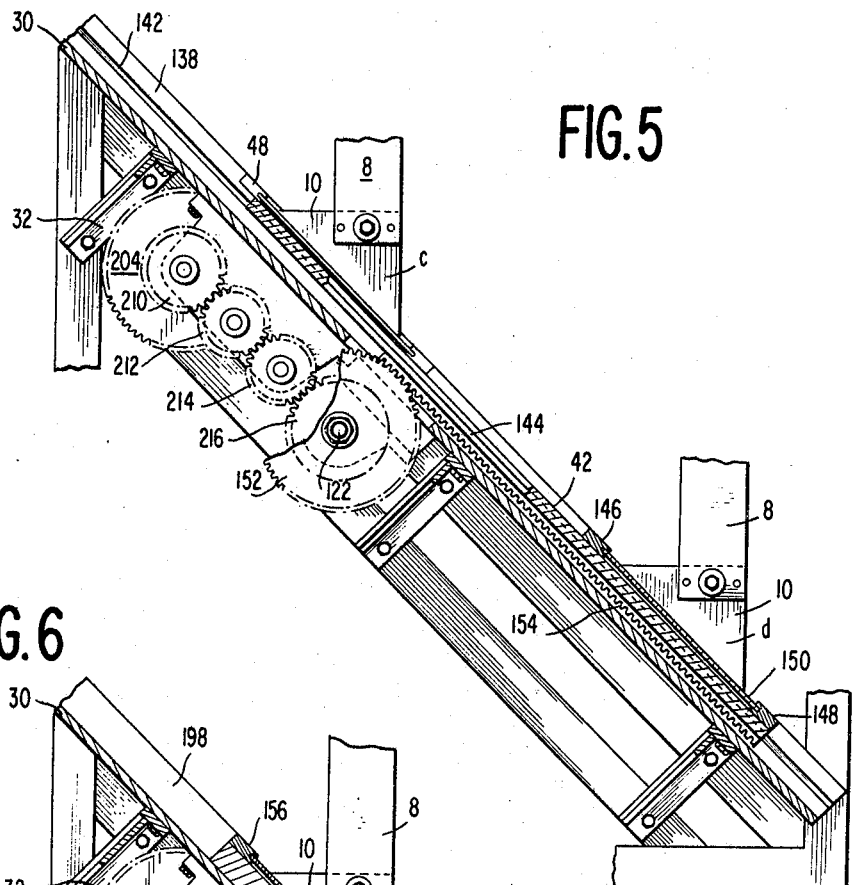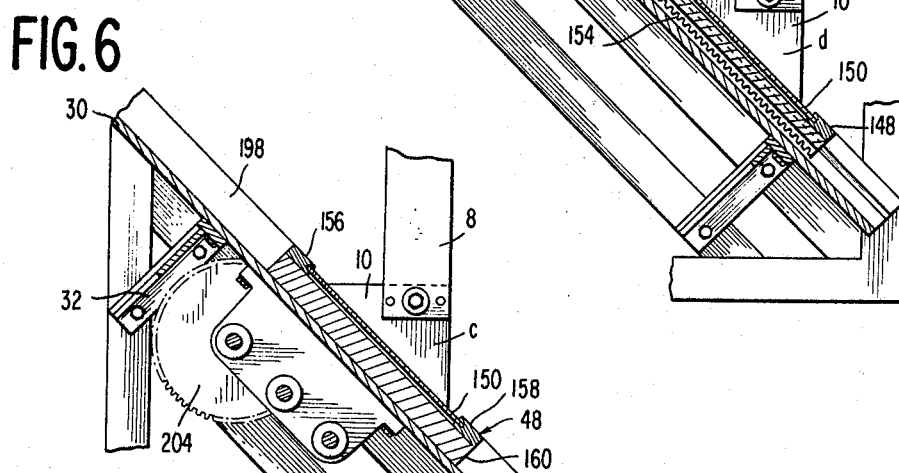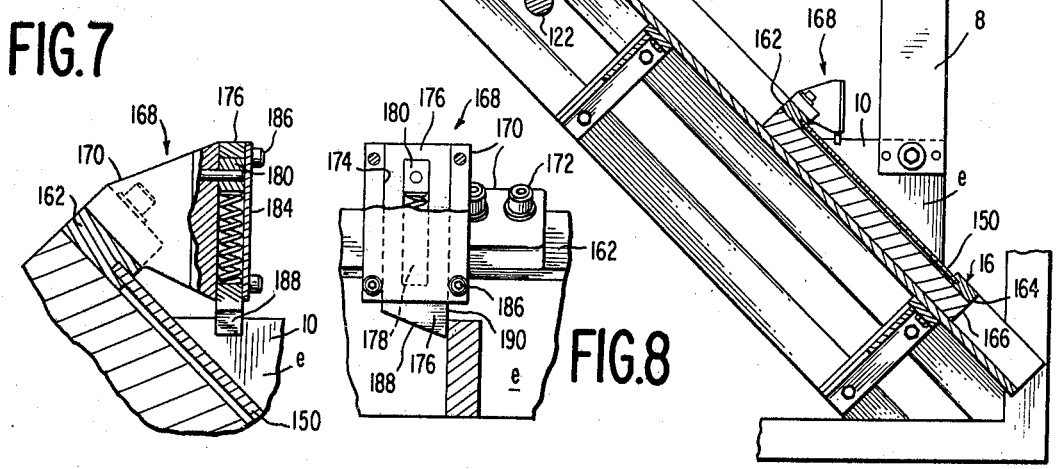

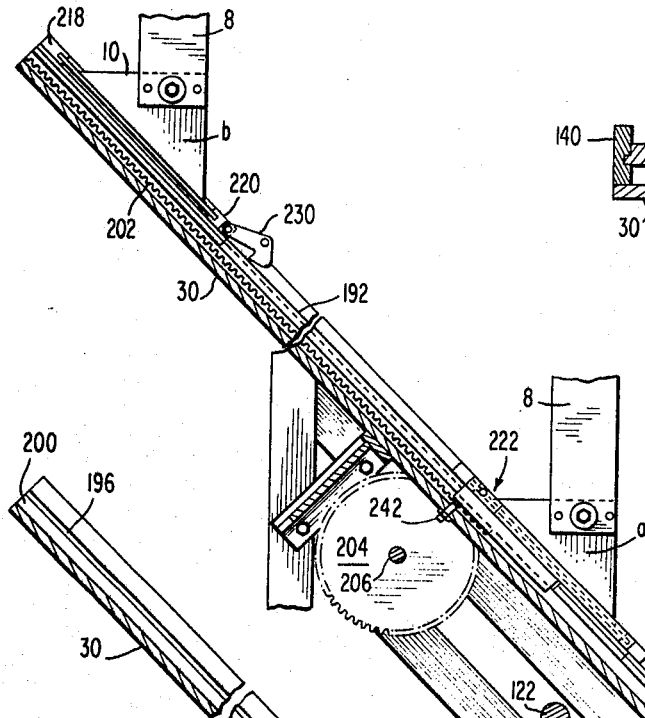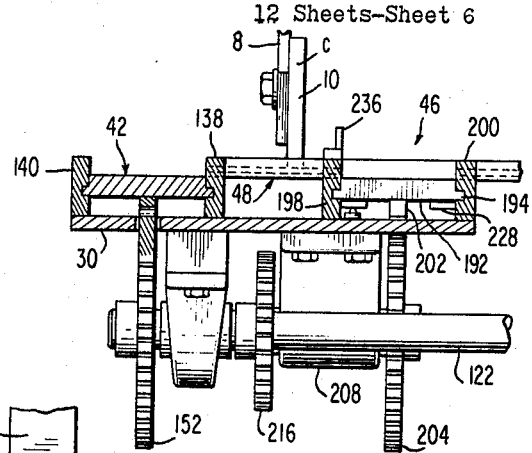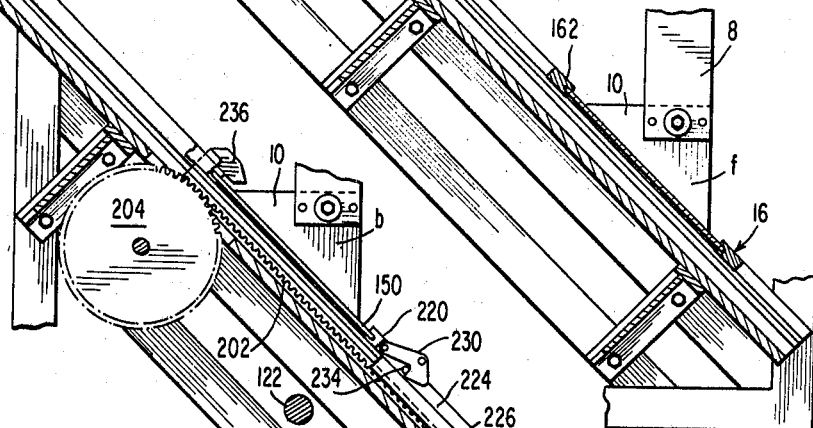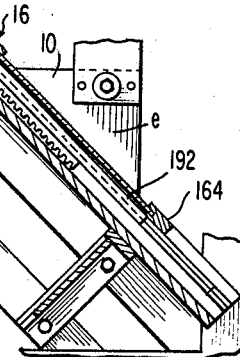

Dec. 2, 1969 C. HORBERG, JR 3,481,516
HOSIERY BOARDING APPARATUS
Filed Jan. 31, 1968 12 Sheets-Sheet 7
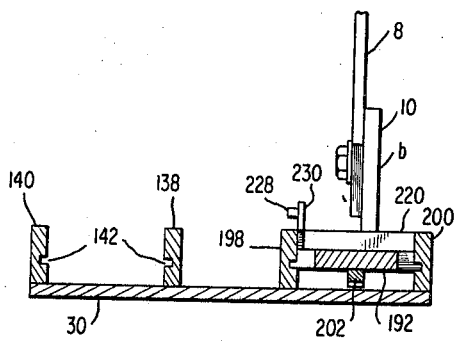
FIG.10
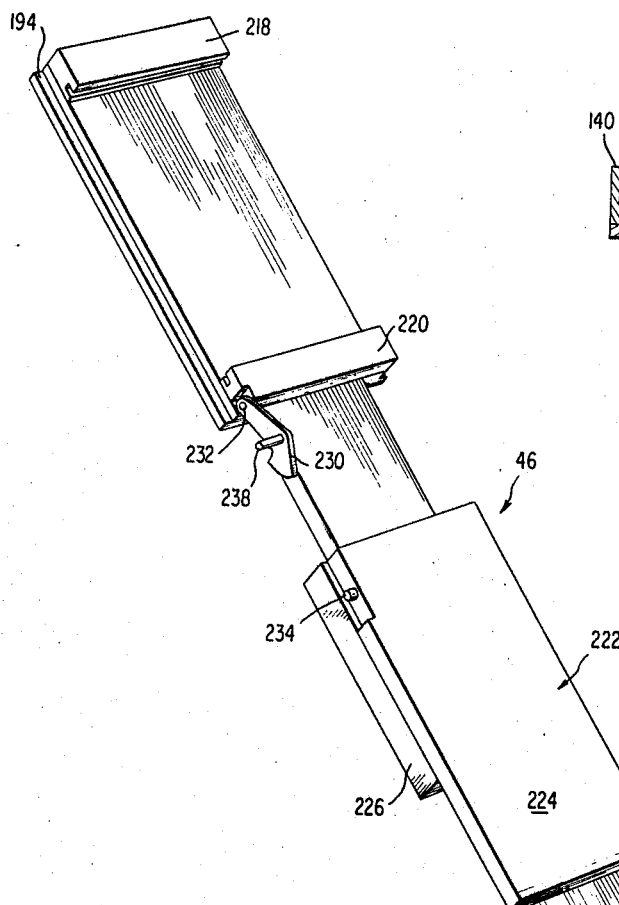
FIG.13
FIG.11
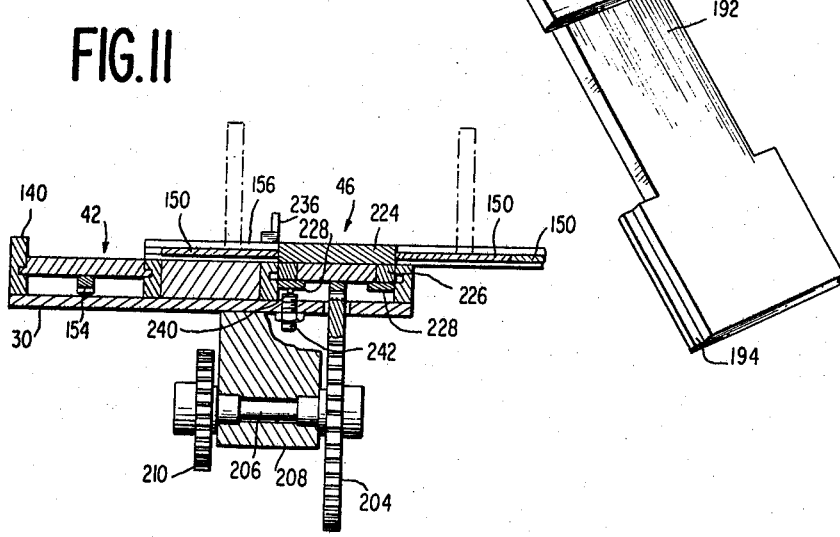

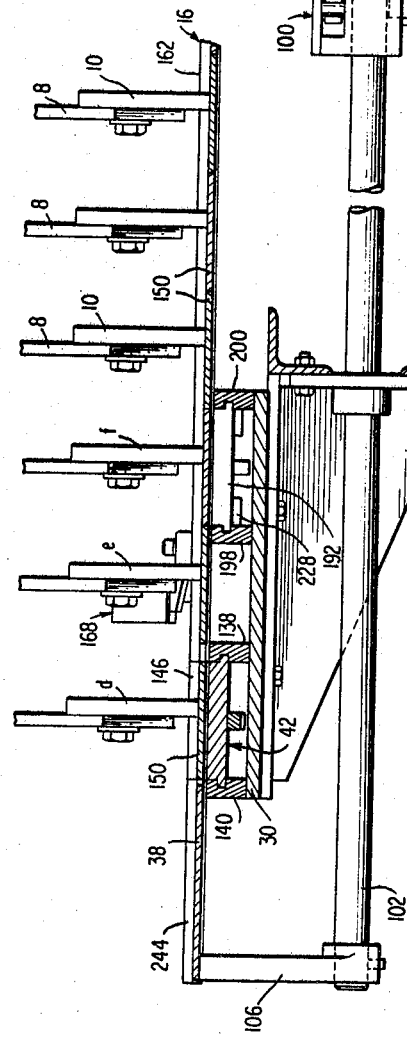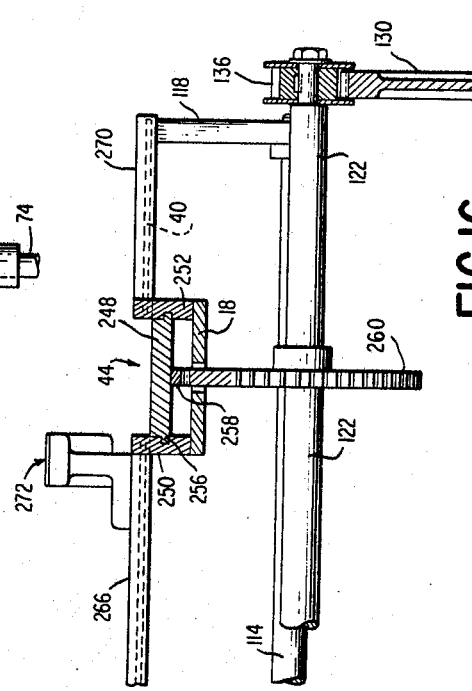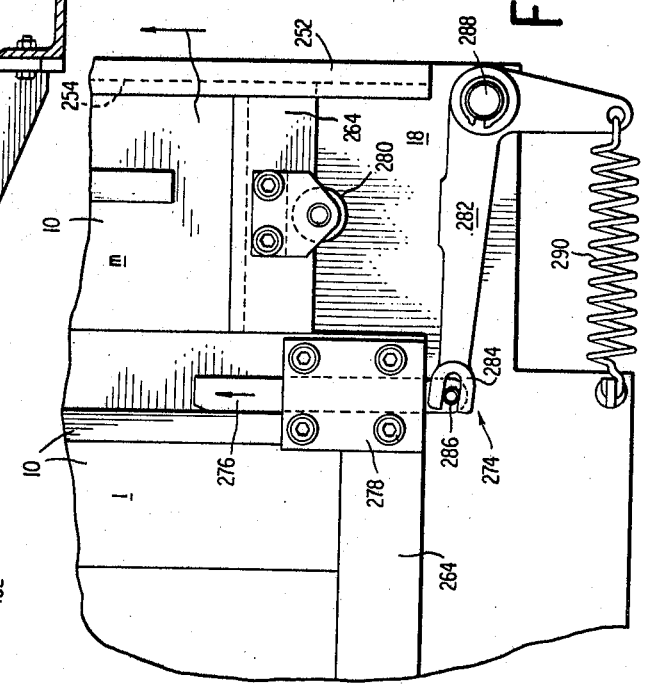

Dec. 2, 1969    C. HORBERG, JR    3,481,516
HOSIERY BOARDING APPARATUS
Filed Jan. 31, 1968    12 Sheets-Sheet 9

Dec. 2, 1969   C. HORBERG, JR   3,481,516
HOSIERY BOARDING APPARATUS
Filed Jan. 31, 1968   12 Sheets-Sheet 10

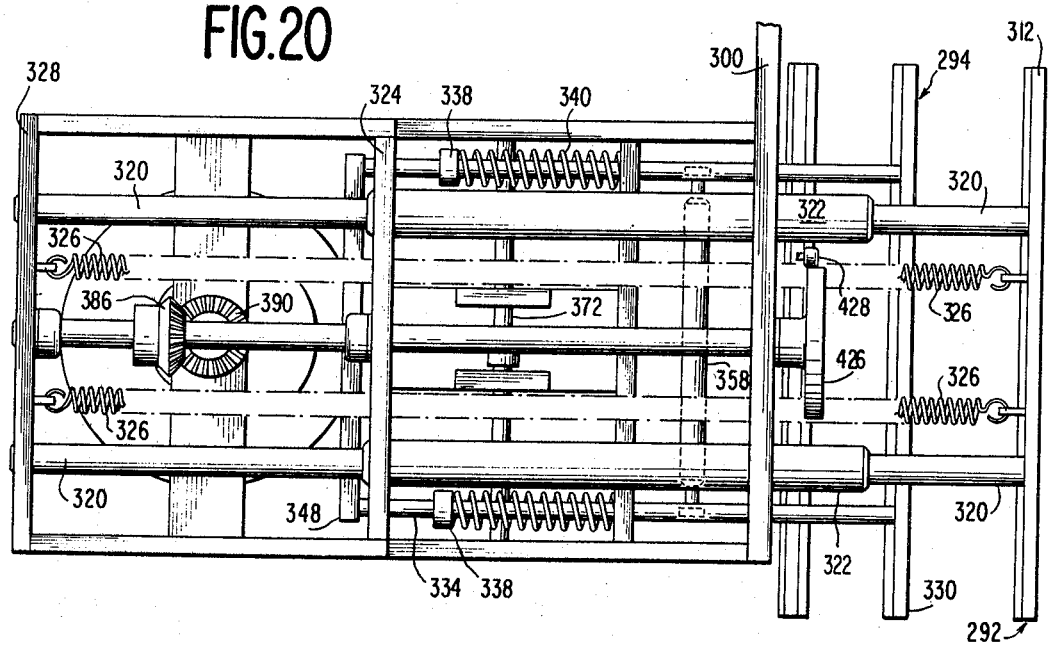
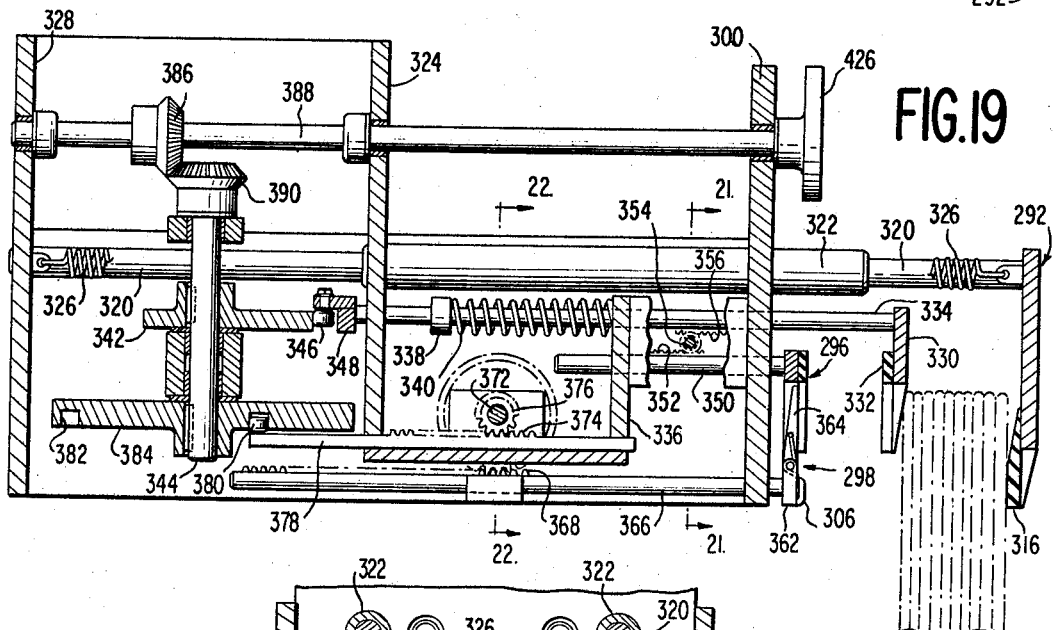
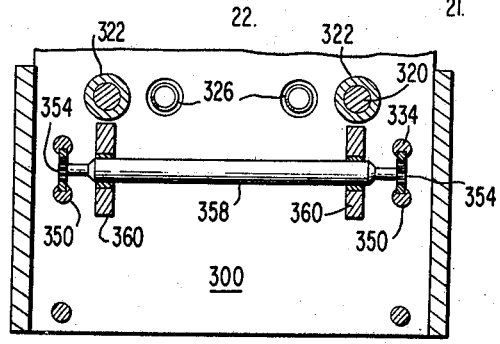

Dec. 2, 1969     C. HORBERG, JR     3,481,516
HOSIERY BOARDING APPARATUS
Filed Jan. 31, 1968     12 Sheets-Sheet 12
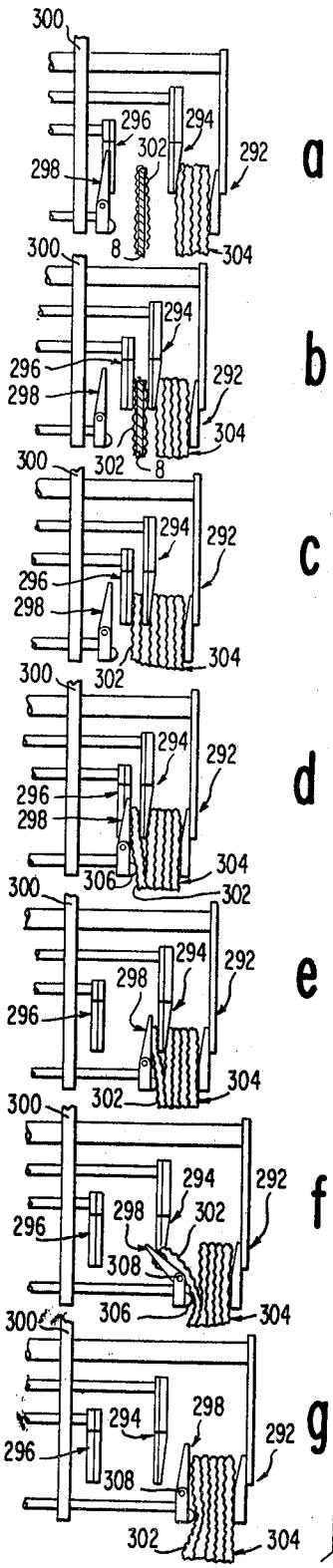
FIG.23
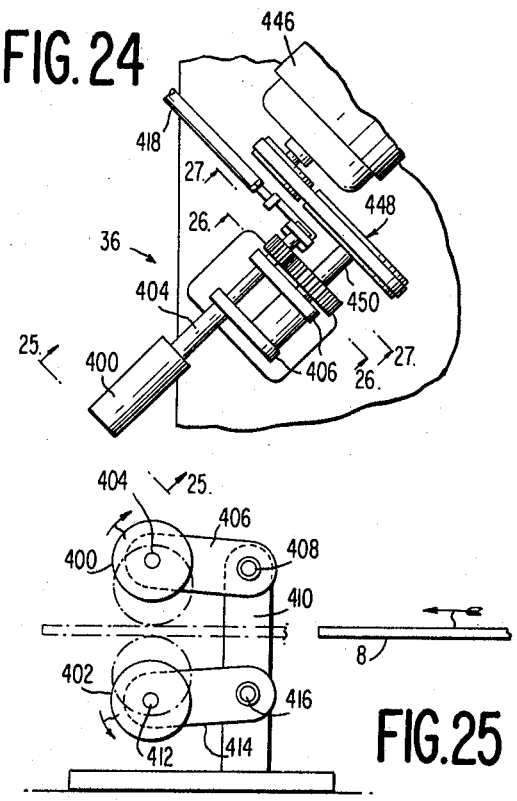
FIG.24
FIG.25
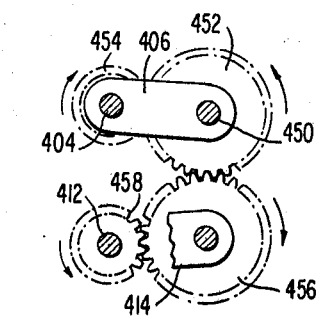
FIG.26
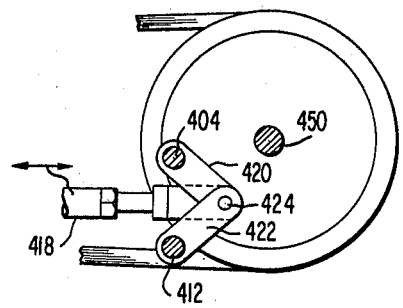
FIG.27

United States Patent Office 3,481,516
Patented Dec. 2, 1969

3,481,516
HOSIERY BOARDING APPARATUS
Charles Horberg, Jr., Northbrook, Ill., assignor to Paramount Textile Machinery Co., Chicago, Ill., a corporation of Illinois
Filed Jan. 31, 1968, Ser. No. 702,078
Int. Cl. D06c 5/00
U.S. Cl. 223—76                                     15 Claims

ABSTRACT OF THE DISCLOSURE

An end loading automatic hosiery boarding machine is disclosed. Empty boarding forms are exposed at the front of the machine for short intervals during which stockings may be placed thereon. The loaded forms then are passed twice through the length of an elongated treatment chamber wherein the stockings are contacted by fluid moving downwardly across the stockings in one zone and upwardly across the stockings in another zone. After emerging from the chamber at the front end of the machine, the finished stockings are removed from the forms and accumulated in bundles by an improved gripper mechanism which holds the foot portion of each stocking as it is being removed from its boarding form and also incorporates the newly removed stocking into the previously accumulated bundle held by the gripper mechanism.

BACKGROUND OF THE INVENTION

This invention relates to the boarding of hosiery and, more particularly, to an automatic machine for shaping knitted stockings and accumulating the finished stockings in groups or bundles wherein the individual stockings are in a flat condition and are in side-by-side relation to each other.

An automatic boarding machine of the general type used heretofore is disclosed in my United States Patent 3,319,849. In such machines, the loaded hosiery boarding forms are passed horizontally once through an elongated drying chamber in side-by-side relation and contacted by heated air flowing vertically in one direction through the chamber. After emerging from one end portion of the chamber, the boarding forms are passed in single file relation through a stripping zone where a movable stripper device grips the foot portion of each stocking and then transfers the stocking to a remote location for collection. Then the empty boarding forms move lengthwise of the chamber across substantially the entire front of the machine in single file relation to each other so as to afford the machine operator an opportunity to place a stocking to be boarded on each of the forms prior to its re-entry into the drying chamber.

Although these machines have proved to be highly useful in the hosiery industry, the available constructions have not been fully adequate for realizing all of the operational advantages that might be gained by automatic boarding equipment. Moreover, the basic layout of these prior machines is inefficient both from the standpoint of floor space utilization and from the standpoint of operator convenience and safety.

SUMMARY OF THE INVENTION

One object of this invention is to provide an automatic hosiery boarding machine so constructed as to permit the machine operator to carry out all of the required stocking loading and unloading operations from a single convenient location in front of an end wall of an elongated treatment chamber having inlet and outlet openings disposed in proximity to each other and to the operator's station.

Another object is to provide an automatic hosiery boarding machine in which empty boarding forms are presented stepwise to a loading zone so as to pace the work of the machine operator and to permit the placing of a stocking on each form while the form is stationary.

Another object is to provide for improved uniformity of fluid treatment within the treatment chamber by so orienting the paths of the stockings and the fluid as to contact the stockings at different times with fluid moving from different directions.

Another object is to provide a compact stocking gripping mechanism which does not protrude into the zone where the machine operator must work and which serves both to effect sequential removal of the finished stockings from their boarding forms and to hold an accumulation of finished stockings in a neat bundle at a location within easy reach of the operator.

In realizing these objects it has been necessary to provide a wholly new machine in which the basic functional components required for automatic boarding operations have been reoriented with respect to each other and individually designed to assure structural compatibility and overall reliability.

In the new machine the boarding forms are attached to individual form carriers which slide along a system of tracks so arranged as to pass the forms twice through substantially the full length of an elongated chamber wherein heated air is blown downwardly over the stockings in one zone and upwardly over the stockings in another zone to assure uniform drying of both the foot and the leg portions of the stockings. Throughout the operation the boarding forms are disposed in vertical planes extending transversely of the longitudinal axis of the chamber so that, as each form emerges from the chamber, it will be disposed in a plane parallel to the front end wall of the chamber. The movements of form carriers take place intermittently, and after completion of the movement which shifts a form out of the chamber, that form is reciprocated in its own plane to deliver the stocking thereon to a stocking gripping mechanism which holds the foot portion of the stocking as the form returns toward a position in alignment with the outlet opening of the chamber.

The stocking gripping mechanism embodies a distinctive combination of structural features which enable it to accomplish its stocking removal and accumulation functions at a single convenient location without endangering or otherwise interfering with the machine operator. A group of gripper components extending generally parallel to each other and to the front chamber wall are mounted for short movements relative to each other for holding the foot portion of a stocking to be removed from its boarding form against the rear face of a gripper member and then, after the boarding form has moved away, incorporating the just removed stocking into a bundle of previously accumulated stockings held by their foot portions just in front of the gripper member.

After the empty form has been returned to a position in alignment with the outlet opening from the drying chamber, it is moved forwardly a short distance for loading. By reason of the intermittent nature of the movements, the endmost form in alignment with the outlet opening will be exposed and in position for loading for a substantial but predetermined time interval. This arrangement serves automatically to pace the work of the machine operator while allowing ample time for the operator to carefully position a stocking to be boarded on each empty form. Thereafter, each form is shifted laterally into alignment with the inelt opening of the chamber and then carried back into the chamber.

BRIEF DESCRIPTION OF THE DRAWINGS

A more complete understanding of these and other features and aspects of the invention will be gained from a consideration of the following detailed description of an embodiment illustrated in the accompanying drawings, in which:

FIGURE 3 is a view taken at generally the same inclination as FIGURE 2 but showing in isloation the means for operating certain pusher devices that serve to shift the form carriers along major portions of their paths of movement;

FIGURE 4 is a similarly inclined top view of other portions of the drive system for operating the machine of FIGURE 1;

FIGURE 5 is a vertical cross-sectional view taken along the line 5—5 in FIGURE 2 and illustrating the transfer slide system at the front of the machine for moving the boarding form carriers from an upper level to a lower level;

FIGURE 6 is a vertical cross-sectional view taken along the line 6—6 in FIGURE 2;

FIGURE 7 is an enlarged view, partly in cross-section of a latching device shown at the lower right portion of FIGURE 6;

FIGURE 8 is a similarly enlarged view of the latching device of FIGURE 7, the view being taken at right angles to the plane of FIGURE 7;

FIGURE 9 is a vertical cross-sectional view taken along the line 9—9 in FIGURE 2 and illustrating the shuttle slide system at the front of the machine for so moving the form carriers as to facilitate the removal of stockings therefrom by the means illustrated generally at the upper left portion of FIGURE 1;

FIGURE 9A is a view similar to FIGURE 9 but showing the parts of the shuttle slide system in different positions;

FIGURES 10, 11 and 12 are cross-sectional views at right angles to FIGURE 9 taken respectively along the lines 10—10, 11—11 and 12—12 in FIGURE 2;

FIGURE 13 is an enlarged perspective view of the shuttle slide shown in FIGURE 9;

FIGURE 14 is a cross-sectional view taken along the line 14—14 in FIGURE 2 and illustrating in greater detail the pusher system for moving the form carriers at the lower level in the machine of FIGURE 1;

FIGURE 16 is a cross-sectional view taken along the line 16—16 in FIGURE 2 and illustrating in greater detail the transfer slide and pusher systems at the rear of the machine;

FIGURE 17 is an enlarged view of a form carrier latching system shown at the upper right portion of FIGURE 2;

FIGURE 19 is the cross-sectional view taken along the line 19—19 in FIGURE 18;

FIGURE 20 is an inclined top view taken at right angles to FIGURE 19;

FIGURE 21 is a cross-sectional view taken along the line 21—21 in FIGURE 19;

FIGURE 23 is a diagrammatic view showing in the successive steps labeled $a$ through $g$ the relative positions of the stocking contacting components of the gripping mechanisms at various portions of a cycle;

FIGURE 24 is a front elevational view showing on an enlarged scale an auxiliary stocking removal device located below and to the right of the gripping mechanism shown in FIGURES 18 through 23;

FIGURE 25 is a view taken along the line 25—25 in FIGURE 24 and illustrating the manner in which the auxiliary stocking removal device cooperates with a boarding form;

FIGURE 26 is a cross-sectional view taken along the line 26—26 in FIGURE 24; and FIGURE 27 is a cross-sectional view taken along the line 27—27 in FIGURE 24.

DESCRIPTION OF THE PREFERRED EMBODIMENT

Figure 1:
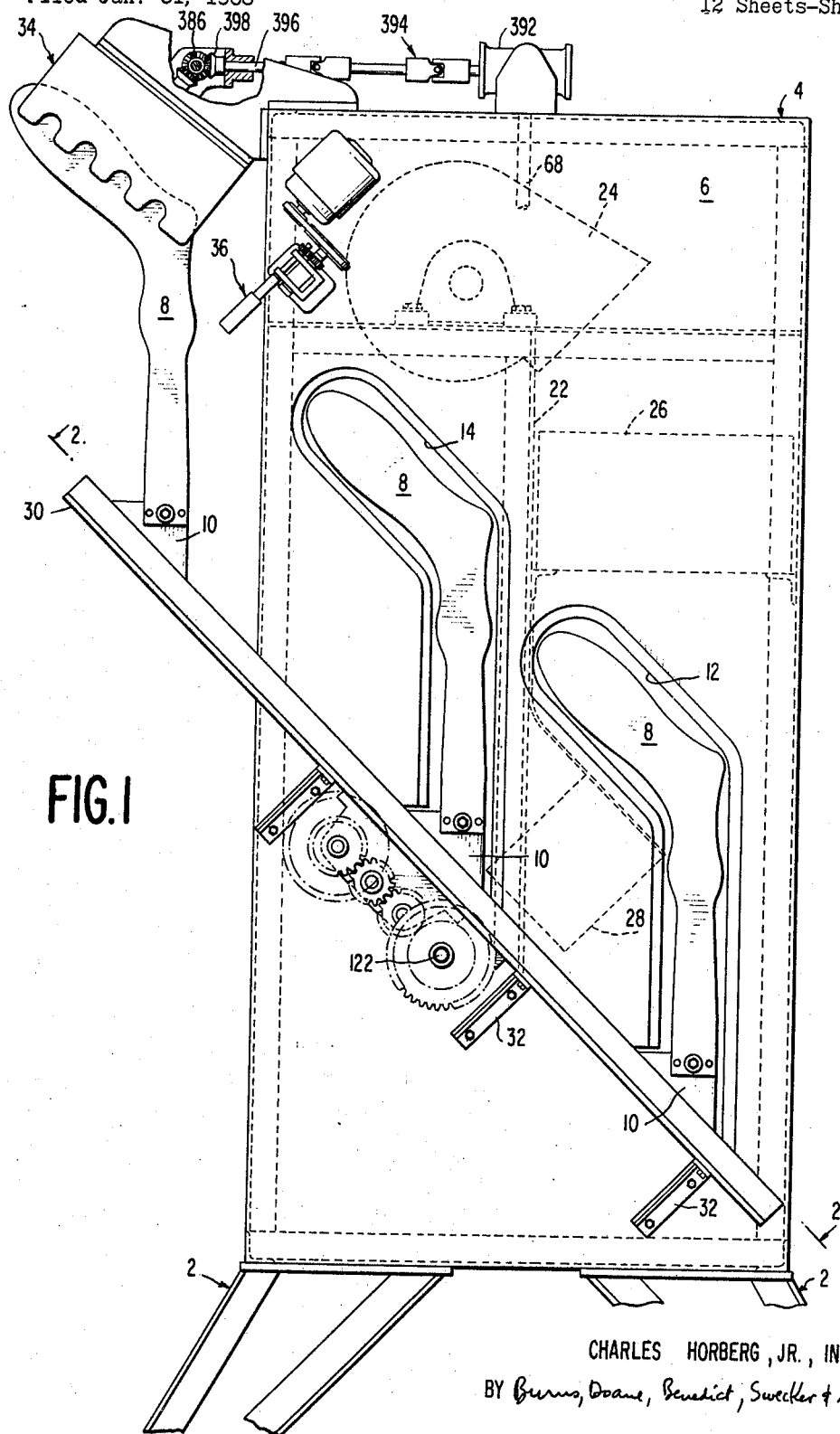
FIGURE 1 is a front elevational view of a hosiery boarding machine constructed in accordance with the invention.

Although the principles of the invention are applicable to the processing of various types of stockings, an embodiment particularly adapted for the boarding of socks has been chosen for illustration in the drawings. This machine includes a base 2 which supports a generally rectangular drying chamber 4 the front end wall 6 of which is illustrated in elevation in FIGURE 1. A series of hosiery boarding forms 8 each detachably mounted on an individual form carrier 10 passes into the chamber 4 through an inlet opening 12 and emerges from the chamber through an outlet opening 14. As shown in FIGURE 1, the openings 12 and 14 in the front wall 6 are of the same general shape as the boarding forms 8.

Figure 2:
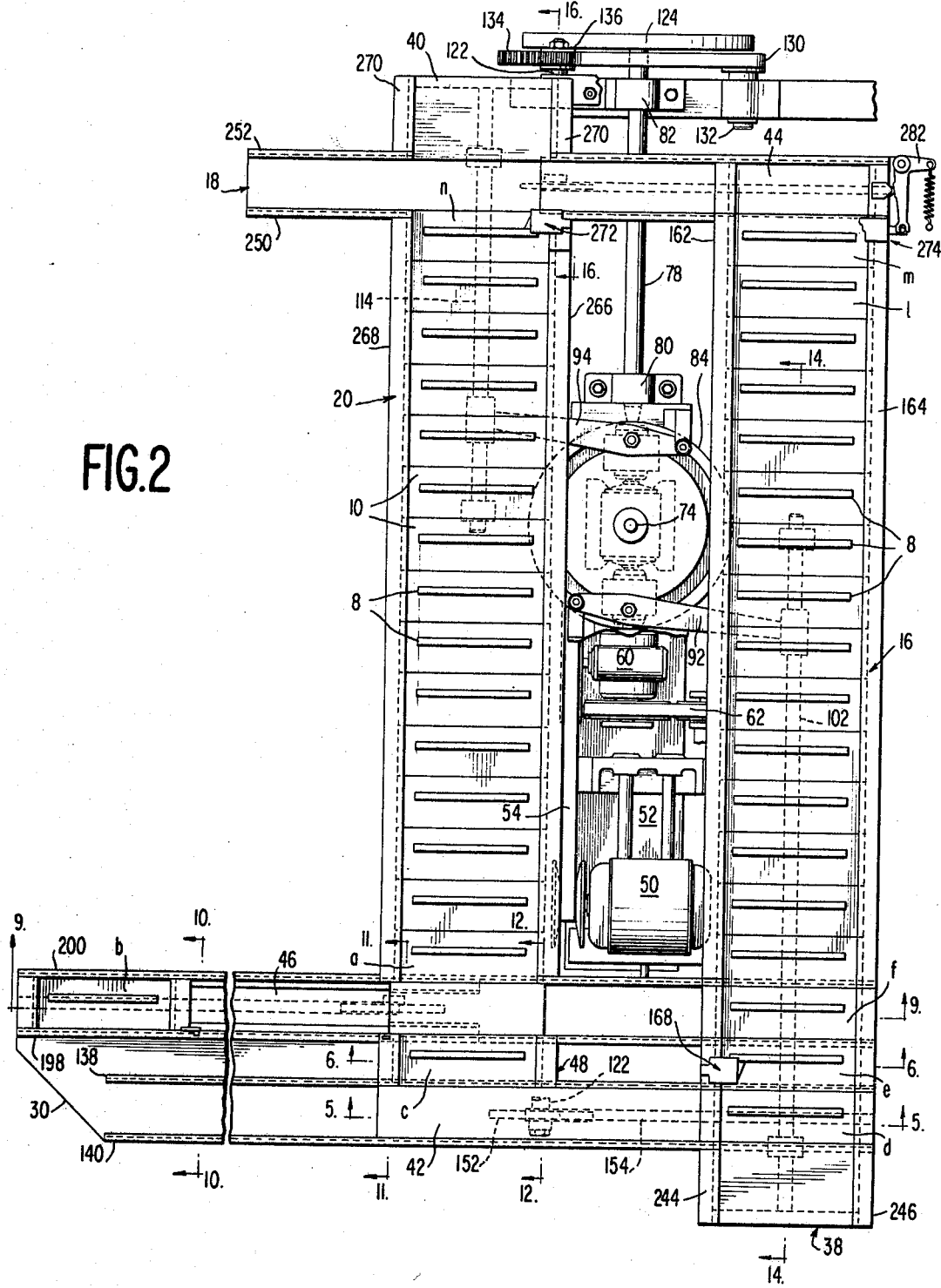
FIGURE 2 is a view illustrating the means for moving and guiding the boarding form carriers in the machine of FIGURE 1, the view being taken along the plane designated by the line 2—2 in FIGURE 1 with the casing of the machine being removed in the interest of clarity.

The form carriers 10 entering the chamber 4 through the inlet opening 12 are shifted rearwardly along a lower track 16 (FIG. 2). At the rear end of the machine, each carrier 10 is transferred from the lower track 16 upwardly and to the left along an incline 18. A longitudinally extending upper track 20 then receives the carriers 10 and serves to guide them as they are moved forwardly through the drying chamber 4 and out of the outlet opening 14 in the front end wall 6.

During the passage of the forms 8 through the chamber 4, the socks carried by the forms are contacted by currents of heated air. As indicated in FIGURE 1, the interior of the chamber 4 preferably is fitted with baffle means 22 located between the upper and lower tracks 16 and 20, and a fan 24 is provided for drawing air upwardly over the socks carried by the forms on the upper track 20 and forcing air downwardly over the socks carried by the forms on the lower track 16. Heat exchanger devices 26 and 28 of conventional construction are located in the flow path for elevating the temperatures of the air sufficiently to promote drying of the socks, the heat exchanger device 26 being disposed directly above the forms moving along the lower track 16 and the heat exchanger device 28 being disposed below the forms moving along the upper track 20. This arrangement assures that both the foot portions and the leg portions of the socks being boarded will be contacted by freshly heated air so that they will be dried uniformly during their passage through the chamber 4.

As incline 30 is fixed to brackets 32 attached to the front wall 6 of the chamber 4. After a form 8 emerges from the outlet opening 14, it is shifted upwardly and to the left along the incline 30 to position the foot portion of the form adjacent a sock gripping mechanism 34 near the top of the machine. This mechanism 34 contacts opposite sides of the foot portion of the sock on the form 8 and exerts a gripping action thereon. Then the form 8 is moved back down the incline 30 to the level of the upper track 20 to free the form automatically from the sock now being held by the mechanism 34.

In order to assure complete separation of the form 8 from the sock held by the mechanism 34, a device 36 (illustrated in greater detail in FIGURES 24–27) is arranged to cooperate with the form 8 as the latter moves back down the incline 30. During this motion, the foot portion of the sock is held by the mechanism 34, but the leg portion of the sock may not have passed completely off the toe end of the form 8. The device 36 includes rollers which contact the leg portion of the sock and move the leg portion in a direction opposite to the direction of movement of the receding form 8. Thus, when the form 8 again reaches the level of the upper track 20 it will be empty and in condition to receive a damp sock to be boarded, and the already processed sock previously carried by the form is held by the mechanism 34 along with such other finished socks as may have been delivered to the mechanism 34 since the time the operator last removed a group of socks therefrom.

The empty form 8 is then moved forwardly across the incline 30 to a loading zone where the operator places a damp sock thereon. Then it is shifted downwardly along the incline 30 to the level of the lower track 16 and moved rearwardly across the incline 30 and through the inlet opening 12.

Figure 2A:
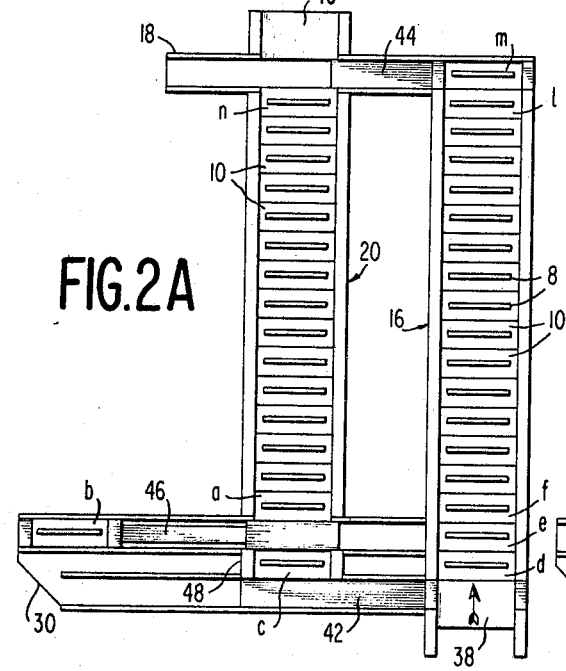
FIGURES 2A, 2B, 2C and 2D are diagrammatic views similar to FIGURE 2 and illustrating the positions of various parts at different times in a cycle of form carrier moving operations.
Figure 2B:
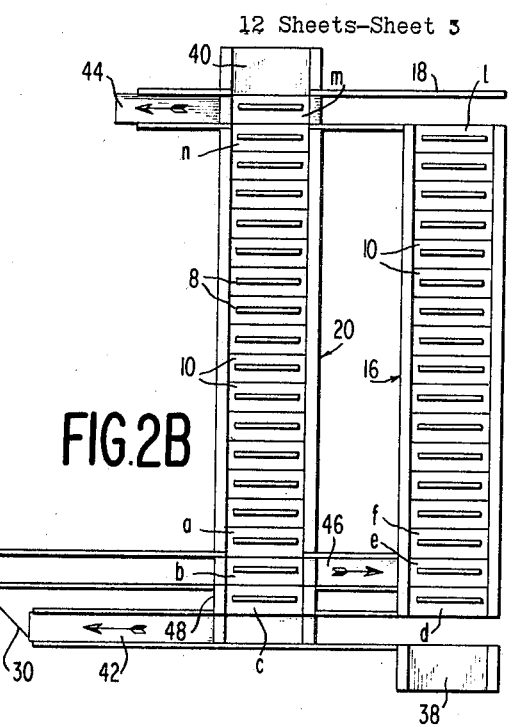
Figure 2C:
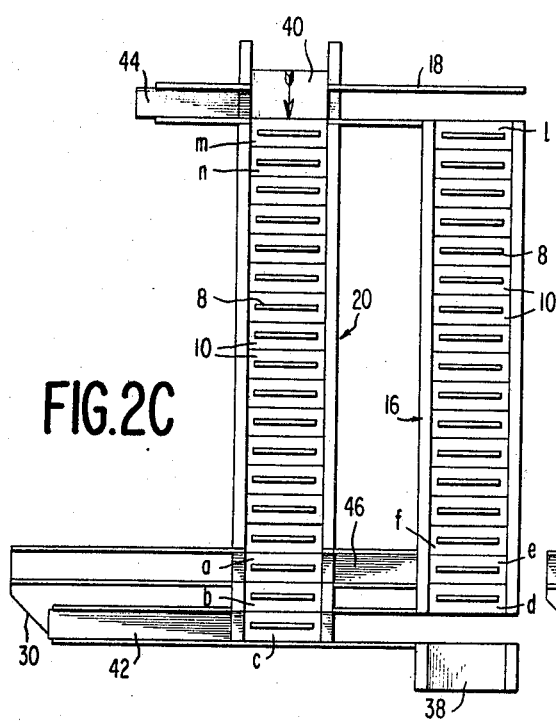
Figure 2D:
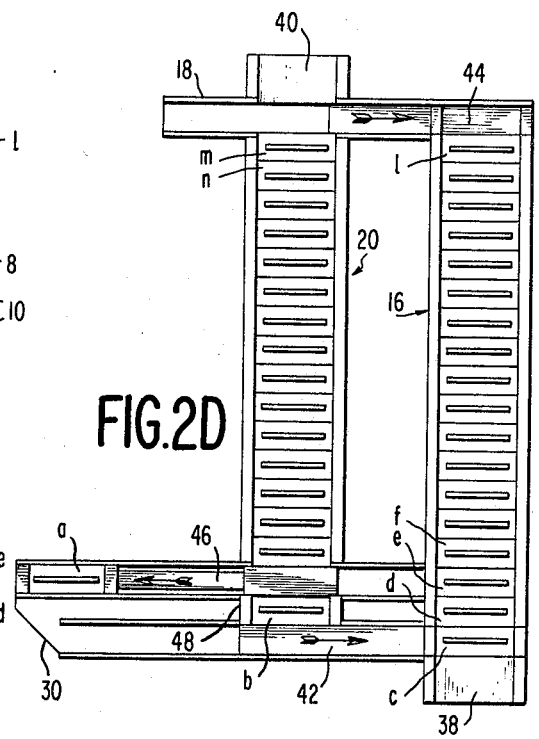

In passing through the paths described generally above, the form carriers 10 and the boarding forms 8 attached thereto, undergo stepwise movements carried out according to a pattern which can be understood readily from a consideration of FIGURES 2 through 2D. FIGURE 2 illustrates the various components by which the desired motions are imparted to the form carriers, and FIGURES 2A through 2D depict the sequence of operation of these components.

Referring initially to FIGURE 2, a pusher plate 38 is positioned adjacent a front end portion of the lower track 16 and is reciprocated back and forth to intermittently contact the endmost form carrier 10 at this level to shift the whole line of form carriers rearwardly along the track 16 a distance equal to the length of one form carrier. Another pusher plate 40 at the rear of the machine cooperates in a similar manner with the form carriers 10 at the level of the upper track 20 to intermittently shift this group of forms in a forward direction. Reciprocating transfer slides 42 and 44 located respectively at the front and at the rear of the machine move the form carriers 10 along the inclines 30 and 18 between the two main tracks 16 and 20 and a reciprocating shuttle slide 46 is provided for moving each form carrier 10 toward and then away from the stocking gripping mechanism 34 after it has emerged from the outlet opening 14 in the front end wall 6 of the drying chamber 4.

Some of the form carriers 10 have applied thereto in FIGURES 2 through 2D certain identifying letters such as a, b, etc. so that the movements of these particular form carriers may be traced through the shifting operations of a cycle. The arrows in FIGURES 2A through 2D indicate movements which occurred just prior to time when the parts reached the illustrated positions.

Taking FIGURE 2 as a starting point, it will be seen that the form carrier a is in a position on the upper track 20 immediately behind the shuttle slide 46; form carrier b is on the shuttle slide 46 in position beneath the stocking gripping mechanism 34; form carrier c is disposed just forwardly of the shuttle slide 46 on a short track 48 on the incline 30 in alignment with the upper track 20; form carrier d is on the front transfer slide 42 in a position in alignment with the lower track 16; form carrier e is on the lower track 16 just behind the transfer slide 42; form carrier f also is on the lower track 16 behind and in contact with the form carrier e; form carrier l is on a rear portion of the lower track 16 at a position one carrier length in front of the rear transfer slide 34; form carrier m is on the lower track 16 immediately in front of the rear transfer slide 44; and form carrier n is at the rear end of the upper track 20.

The first form carrier shifting operation which occurs after the carriers are in the positions shown in FIGURE 2 results from a rearward motion of the pusher plate 38 along the lower track 16 a distance equal to the length of one form carrier. This serves to position the parts as indicated in FIGURE 2A. From this view it will be observed that the carrier d has been moved off the front transfer slide 42 onto the lower track 16 and the form carrier m has been moved from the rear end of the track 16 onto the rear transfer slide 44.

Thereafter the front pusher plate 38 moves back to its forwardmost position (FIGURE 2), and then the transfer slides 42 and 44 and the shuttle slide 46 are moved in the directions indicated by the arrows in FIGURE 2B to bring the parts into the positions shown in this view. Thus, shuttle slide 46 moves down the incline 30 to bring form carrier b into alignment with the upper track 20; rear transfer slide 44 moves upwardly along incline 18 to bring carrier m into alignment with the rear end of the upper track 20; and front transfer slide 42 moves upwardly to position it for the reception of a form carrier from the upper track 20.

Next, the rear pusher plate 40 is moved to shift all of the form carriers on or in alignment with the upper track 20 forwardly a distance equal to the length of one form carrier, as suggested in FIGURE 2C. This moves form carrier m off the rear transfer slide 44 onto the track 20; moves carrier a onto the shuttle slide 46; moves carrier b off the shuttle slide 46 and onto the track extension 48; and moves carrier c onto the front transfer slide 42.

Immediately after having reached the position shown in FIGURE 2C, the rear pusher plate 40 moves rearwardly again to its rearmost position, and then the several slides 42, 44 and 46 are moved in the directions indicated by the arrows in FIGURE 2D. Thus, form carrier c is transferred by the front transfer slide 42 from the level of the upper track 20 to the level of the lower track 16; carrier a is shifted upwardly and to the left along the incline 30 by the shuttle slide 46 to a position beneath the stocking gripping mechanism 34; and the rear transfer slide 44 is moved downwardly along the incline 18 to position it for the reception of a carrier from the rear end of the lower track 16.

The drive means for imparting the desired movements to the carrier shifting components are shown in FIGURES 2, 3 and 4. A motor 50 mounted on suitable support means 52 drives a belt 54 through a pulley 56. The belt 54 in turn drives a pulley 58 fixed to the input shaft of a gear box 60 having output shafts at both of its ends. The output shaft at the front end of the gear box 60 drives a belt 62 for transmitting power to direction-changing gear 64, the output shaft 66 of which is connected through a universal joint to a drive shaft 68 for supplying power to the stocking gripping mechanism 34 at the top front portion of the machine.

The rear output shaft from the gear box 60 is coupled through suitable transmission and/or clutch means 70 to another gear box 72 having an upwardly extending output shaft 74 and also a rearwardly extending output shaft coupled through transmission and/or clutch means 76 to a shaft 78 mounted in bearings 80 and 82.

As shown best in FIGURE 3, a cam 84 for controlling the movements of the pusher plates 38 and 40 is fixed to an upper end portion of the driven shaft 74. The upper face of the cam 84 is provided with a groove or track 86 which receives cam followers attached at 88 and 90 to links 92 and 94. One end 96 of the link 92 is pivotally connected to stationary frame means 98, and its other end is loosely connected at 100 to a rod 102 mounted for horizontal sliding movement in bearing means 104. A connecting member 106 is fixed to the front end of the rod 102 and to the front pusher plate 38 so that the pusher plate will move with the rod.

Similarly, one end 108 of the link 94 is pivotally connected to stationary frame means 110, and its other end is loosely connected at 112 to a rod 114 mounted for horizontal sliding movement in bearing means 116. A connecting member 118 is fixed to the rear end of the rod 114 and to the rear pusher plate 40 so that the rear pusher plate 40 will move with the rod 114.

The cam track or groove 86 is generally circular, but includes a portion 120 the radius of which first decreases and then increases. As the cam 84 rotates, the links 92 and 94 will therefore remain stationary except when the respective cam followers enter the portion 120 of the cam groove 86. The passage of the portion 120 of the cam groove adjacent a cam follower will cause that cam follower to partake of a short back-and-forth movement, and this in turn causes one of the pusher drive rods 102 or 114 to reciprocate.

In order that the movements of the several inclined slides 42, 44 and 46 may be synchronized properly with the movements of the pusher plates 38 and 40, the shaft 78 coupled to the rearwardly extending output from the gearbox 72 is relied upon to impart oscillating movement to a main slide-operating shaft 122 extending horizontally from the rear to the front of the machine. The manner in which the shaft 78 is coupled to the shaft 122 can best be understood by reference to FIGURES 2, 4, 15 and 15A.

Figure 15:
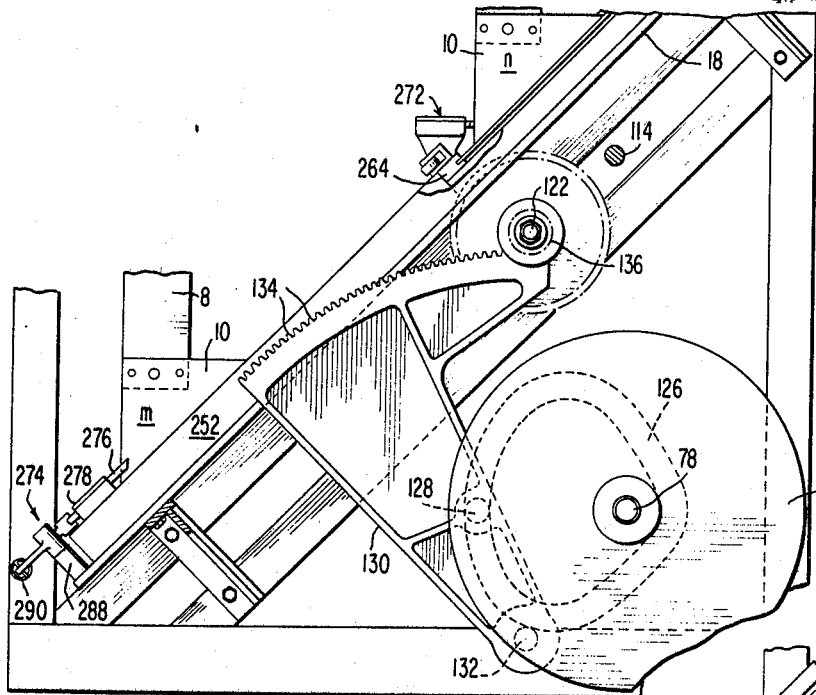
FIGURE 15 is a partial rear elevational view of the machine of FIGURE 1, with the casing removed to reveal certain of the drive components for operating the various slide systems of the machine.
Figure 15A:
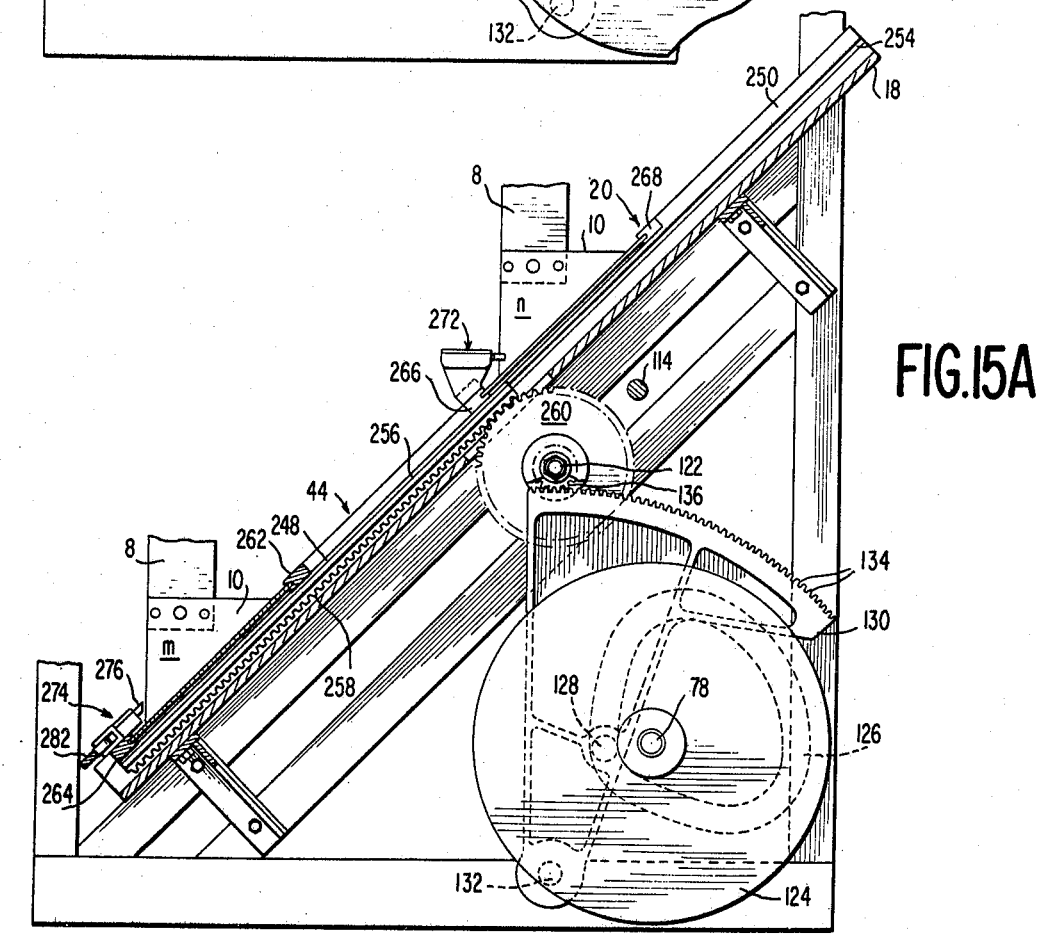
FIGURE 15A is a similar view which shows the rear transfer slide in cross-section and in a different position.

The rear end of the continuously rotating shaft 78 has fixed thereon a cam plate 124, the front face of which is provided with a cam groove 126 of the configuration suggested by the dotted lines in FIGURES 15 and 15A. Cooperating with the cam groove 126 is a cam follower 128 extending rearwardly from a segment member 130 located just in front of the cam plate 124 and pivoted to the stationary frame at 132. The upper edge of the segment member 130 is an arc of uniform radius about the pivot 132 and is provided with gear teeth 134 meshing with a small gear 136 fixed on the rear end of the main slide-operating shaft 122.

The shape of the cam track or groove 126 in the front face of the cam plate 124 is such that the cam follower 128 is held stationary during two spaced-apart portions of each revolution of the drive shaft 78, as indicated in FIGURE 15. Thus, during each rotation of the drive shaft 78, the slide-operating shaft 122 is held stationary for a while, a rotated in one direction, held stationary for a while, and then rotated a corresponding amount in the opposite direction.

Reference will now be made to FIGURE 5 for a more detailed explanation of the construction of the front transfer slide 42 and the means by which it is coupled to the slide-operating shaft 122. This view should be considered in connection with FIGURE 2.

The slide 42 reciprocates in a track formed by upright members 138 and 140 fixed to the incline 30. Each of the uprights 138 and 140 is provided with a groove 142 for receiving a laterally projecting lip 144 on the body of the slide 42 so that the slide will be constrained against movements toward and away from the incline 30.

On its upper surface the transfer slide 42 is provided with a form carrier receiving pocket or station made up of short track sections 146 and 148 having grooves in their opposing faces for receiving the marginal edges of the base 150 of a form carrier. The particular form carrier shown in FIGURE 5 as being located in the pocket of the transfer slide 42 is the one which was designated by the letter d in FIGURE 2.

The desired reciprocating movements are imparted to the transfer slide 42 by a gear 152 fixed on the front end portion of the slide-operating shaft 122 and cooperating with a rack 154 extending along the underside of the transfer slide 42. As the shaft 122 is oscillated, the transfer slide 42 will be reciprocated back and forth along the incline 30 in proper timed relation to the movements of the other components of the machine.

FIGURE 6 illustrates the short track extension 48 and other components located just behind the front transfer slide 42. The track extension 48 is made up of a pair of track sections 156 and 158 having grooves for receiving the marginal edges of the base 150 of a form carrier. These track sections 156 and 158 are attached to a support 160 fixed to the front incline 30. As shown in this view, the main lower track 16 is of similar construction. It includes track sections 162 and 164 mounted on stationary support means 166.

There is also shown generally in FIGURE 6 a latching device 168 which cooperates with the frontmost form carrier 10 on the lower track 16 to prevent undesired movements of the carriers on this track toward the front of the machine. This device provides assurance that the carriers, after being moved rearwardly by the front pusher plate 38, will not bounce back sufficiently to interfere with the proper operation of the front transfer slide 42. The structural features of one suitable form of latching device 168 are illustrated in FIGURES 7 and 8.

The latch includes a body 170 secured by suitable means 172 to the top of the track section 162. A vertical surface of the body 170 facing the adjacent boarding form 8 is provided with a groove 174 for receiving a vertically reciprocable plunger 175. The plunger 176 is itself provided with a slot 178 for receiving a small block 180 which is rigidly connected to the body 170 of the latching device. A compression spring 182 is located within the plunger slot 178 beneath the plug 180 and is held in place by a cover plate 184 secured to the body 170 by screws 186.

The downwardly protruding lower end portion of the plunger 176 has an inclined surface 188 facing forwardly along the track 16 and a vertical surface 190 facing rearwardly. As a form carrier 10 is moved rearwardly along the track 16, it contacts the inclined surface 188 to lift the plunger 176. Then, when the vertical portion of the form carrier clears the plunger 176, the spring 182 returns the plunger to its lowermost position so that the vertical surface 190 of the plunger will block any return movement of the form carrier toward the front of the machine.

Reference should now be made to FIGURES 9 through 13 in order that a complete understanding of the construction and operation of the shuttle slide 46, shown more generally in FIGURE 2, may be gained. The shuttle slide 46 includes an elongated plate or body member 192 having lateral extensions 194 which reciprocate within grooves 196 in a pair of upright track members 198 and 200 secured to the incline 30. A rack 202 fixed to the underside of the plate member 192 meshes with a drive gear 204 on a short shaft 206 rotatably mounted in suitable bearing means 208. The front end of the shaft 206 is connected through gears 210, 212, 214 and 216 (FIG. 5) to the main slide-operating shaft 122 of the machine, so that as the shaft 122 is oscillated back and forth, the shuttle slide 46 will be reciprocated up and down the incline 30.

At its left, or upper end, the body 192 of the shuttle slide 46 carries track sections 218 and 220 for receiving the marginal edge portions of a form carrier 10. These track sections 218 and 220 have lengths equal to the length of one form carrier 10 and they serve to provide a carrier-receiving pocket at the upper end of the shuttle slide 46 much like the pocket at the lower end of the front transfer slide 42.

A blocking unit 222 is slidably mounted on an intermediate portion of the body plate 192 of the shuttle slide 46. The blocking unit 222 includes an upper plate 224 overlying and resting upon the plate 192, side members 226 embracing the lateral edges of a narrowed central portion of the body plate 192, and bottom members 228 extending inwardly from the side members 226 to contact the bottom face of the body plate 192 (FIG. 11). The length of the top plate 224 of the blocking unit is substantially greater than the lengths of the side members 226, as shown in FIGURE 13, so that when the blocking unit 222 moves downwardly along the narrowed central portion of the body plate 192, the top plate 224 may overlie the lower end portion of the body plate 192 in the manner shown in FIGURE 9.

The upper end of the range of travel of the blocking unit 222 along the body plate 192 is fixed by the position of the track section 220. The blocking unit 222 may be held in this upper position by a latch 230 pivoted at 232 to the track section 220 and cooperating with a pin 234 extending laterally from the base of a notch in the upper portion of the top plate 224 of the blocking unit. The latched positions of the parts are indicated in FIGURE 9A.

As shown in FIGURES 9A, 11 and 12, the upper edge of the front shuttle slide track member 198 has fixed thereto a cam 236 located just above the level of the upper track 20. As the shuttle slide 46 moves upwardly and to the left, the cam 236 cooperates with a pin 238 extending laterally from the latch 230 to lift the latch and disengage it from the pin 234 on the blocking unit 222. Concurrently with the release of the latch 230, the blocking unit 222 is engaged by a spring-loaded holding element 240 carried by means 242 secured to the incline 30 (FIGURES 9, 11 and 12). The frictional engagement between the spring-loaded holding element 240 and the blocking unit 222 serves to retain the blocking unit 222 in position in front of the upper track 20 while the body plate 192 of the shuttle slide 46 completes its upward movement along the incline 30 to position a form carrier adjacent the stocking gripping mechanism 34 of the machine.

When the body plate 192 of the shuttle slide 46 is again moved downwardly along the incline 30, the latch pin 238 rides up over the cam 236 to elevate the latch 230 so that it may fall down over the pin 234 on the blocking unit just as the track section 220 contacts the upper end of the blocking unit 222. Then blocking unit 222 and the main body plate 192 of the shuttle slide 46 move downwardly and to the right together, with the body plate 192 passing beneath a portion of the main lower track 16, as indicated in FIGURE 9A.

FIGURE 14 also shows the spatial relationship which permits the body plate 192 of the shuttle slide 46 to pass freely beneath the main lower track 16. In addition, this view will serve to further clarify the effects produced upon reciprocation of the front pusher plate 38.

As shown in FIGURE 14, the front pusher plate 38 is guided by short track sections 244 and 246 (FIG. 2) fixed to the member 140 at the front edge of the incline 30. The track sections 244 and 246 are disposed in alignment with the track elements 162 and 164 which make up the main lower track 16. When the front pusher plate 38 is moved to the right as viewed in FIGURE 14, its rear end contacts the front edge of the base 150 of the form carrier disposed in the pocket of the front transfer slide 42 and moves this form carrier out of the pocket of the slide 42 onto the main lower track 16. All of the bases 150 of the form carriers 10 on the track 16 are disposed in abutting relationship to each other, and this whole series of form carriers 10 will be moved rearwardly as a unit. Then, the front pusher plate 38 moves back to the left in FIGURE 14, to clear the path of the front transfer slide 42 and leave the pocket thereof empty and in condition to receive another form carrier 10 during a later portion of the cycle.

The rear transfer slide mechanism 44 is similar in construction and mode of operation to the front transfer slide mechanism 42, and the various structural components thereof are illustrated in FIGURES 15, 15A and 16.

The body 248 of the rear transfer slide 44 moves back and forth along the rear incline 18 in a guideway formed by upright elements 250 and 252 fixed to the incline 18. Grooves 254 in the opposing faces of the uprights 250 and 252 receive lateral extensions 256 of the body member 48 to prevent movements of the transfer slide toward and away from the incline 18. A rack 258 is attached to the bottom of the body member 248 and is driven by a gear 260 fixed to the slide-operating shaft 122.

Short track sections 262 and 264 cooperate with the upper face of the body member 248 to define a carrier-receiving pocket near the lower end of the transfer slide. Hence, as the slide-operating shaft 122 is oscillated back and forth, the carrier-receiving pocket of the transfer slide 44 is shifted back and forth along the incline 18 from the level of the lower track 16 to the level of the upper track 20.

FIGURES 15A and 16 also show the track components 266 and 268 which make up the main upper track 20 of the machine, and FIGURE 16 additionally shows one of the short track segments 270 which serve to guide the rear pusher plate 40 in the rearmost position thereof. The cooperation of the rear pusher plate 40 with these track segments 270 with the form carriers 10 disposed in alignment with the main upper track 20 is the same as that described above in the discussion of the cooperation between the front pusher plate and the corresponding machine components.

A latching device 272, of a construction essentially the same as that of the latching device 168 described in detail above in connection with FIGURES 7 and 8, is fixed on the upper surface of the track component 266 of the main upper track 20 at a location just in front of the path of the rear transfer slide 44. This latching device 272 cooperates with the rearmost form carrier *n* on the upper track 20 in the manner indicated in FIGURES 15 and 15A to prevent undesired rearward movement of this form carrier after an operation of the rear pusher plate 40 has been completed. Hence, there is no danger of a bounce-back motion of the form carriers on the track 20, which might serve to block the path of the rear transfer slide 44.

Another latching mechanism 274, best illustrated in FIGURE 17, is located at the rear end of the main lower track 16 to eliminate any possibility that the rearward movement of the form carriers on this track might result in an overthrow effect that would serve to block the path of the rear transfer slide 44. If desired, a similar latching mechanism may be associated with the short track extension 48 and the transfer slide 42 at the front end of the machine, but this will normally not be necessary.

The latching mechanism 274 includes a pin 276 mounted for reciprocation in a housing 278 attached to the upper surface of the lower track section 264. As shown in FIGURE 17 the pin 276 is in its innermost position and its inner end portion blocks the path of the form carriers 10 on the lower track 16. However, the pin 276 may be withdrawn (FIGURE 15A) to clear the path of the form carries 10 on the lower track 16.

The insertion and withdrawal movements of the pin 276 of the latching device 274 are controlled by the rear transfer slide 44. The track section 264 at the lower end of the rear transfer slide 44 carries a cam roller 280 which strikes a lever 282 when the rear transfer slide 44 reaches its lowermost position. A yoke 284 on one end of the lever 282 engages a connector element 286 in the outer end of the latching pin 276 to cause withdrawal of the pin 276 as the rear transfer slide 44 reaches its lowermost position. As illustrated, the lever 282 is of L-shaped construction and is pivotally connected by means 288 to a stationary portion of the machine at a location between its legs. A tension spring 290 is connected to the lever 282 to return it to the position shown in FIGURE 17 as the rear transfer slide 44 moves upwardly.

The structural features of the stocking gripping mechanism 34 at the upper front portion of the machine are illustrated in detail in FIGURES 18 through 22. Before turning to these views, however, it will be desirable to refer more generally to the sock contacting components of this mechanism and to the sequence of operation of these components, as illustrated schematically in FIGURE 23.

There are four major sock contacting components of the mechanism 34. These are a front gripper 292, an intermediate gripper 294, a rear gripper 296, and a swing clamp 298. All of these are carried by rod members mounted for reciprocation with respect to a stationary frame part 300 parallel to the front wall 6 of the chamber 4.

FIGURE 23 shows, in seven steps labeled *a* through *g*, the relative positions of the sock contacting components and the stationary frame member 300 as the foot portion of a sock 302 is transferred from a boarding form 8 to a position alongside a group of four previously accumulated socks 304. In steps *a* and *b*, the boarding form 8 is assumed to be substantially in the position shown at the upper left portion of FIGURE 1, and in the remaining steps, it is assumed that the boarding form 8 has been retracted downwardly along the incline 30.

As one further preliminary to a discussion of the sequence depicted in FIGURE 23, it should be pointed out that the lower end portion of the intermediate and rear grippers 294 and 296 have identical undulating configurations and that the upper end portion of the swing clamp 298 has a similar undulating configuration that is out of phase with that of the grippers 294 and 296. This feature, illustrated in FIGURE 18, permits the swing clamp 298 to move past the intermediate and rear grippers 294 and 296 without contacting these components.

In view *a*, the previously collected socks 304 are clamped between the front gripper 292 and the front face of the intermediate gripper 294; both the intermediate gripper 294 and the rear gripper 296 are spaced from the sock 302 on the boarding form 8; and the swing clamp 298 is in a retracted position near the stationary frame member 300.

In reaching the position shown in view *b*, the intermediate and rear grippers 294 and 296 have moved equal distances in opposite directions, and the front gripper 292 has followed exactly the motion of the intermediate gripper 294. In this view, the previously accumulated socks 304 are still clamped between the front gripper 292 and the front face of the intermediate gripper 294. The rear face of the intermediate gripper 294 and the front face of the rear gripper 296 have, however, moved into gripping engagement with the sock 302 on the boarding form 8.

Then the boarding form 8 recedes; the intermediate and rear grippers 294 and 296 move closer together to maintain their hold on the sock 302 after withdrawal of the boarding form 8; and the swing clamp 298 begins to move forwardly, as indicated in view *c*. Again, it will be observed that the front gripper 292 has followed the movements of the intermediate gripper 294 to maintain a firm grip on the bundle of socks 304.

A continuation of the forward movement of the swing clamp 298 will bring the parts into the relative positions shown in view *d*. The upper end portion of the swing clamp 298 moves past the lower end portion of the rear gripper 296 to contact the sock 302 and a bumper pad 306 on a lower portion of the swing clamp 298 contacts a lower portion of the sock 302.

Next, as indicated in view *e*, the intermediate and rear grippers 294 and 296 are moved in opposite directions to return these components to the positions they occupied at the beginning of the cycle (view *a*). During this movement, the front gripper 292 still follows the intermediate gripper 294 to assure that the previously collected socks 304 will be firmly held in place. The swing clamp 298 also continues its forward movement and cooperates with the intermediate gripper 298 to support the new sock 302.

The drive system for the intermediate gripper 294 does not require any further forward movement of this component, but some additional forward movement against the bias of a spring is permitted. On the other hand, the swing clamp 298 is moved forward positively to the position shown in view *f*. During the movement of the swing clamp 298 from the position shown in view *e* to that shown in view *f*, the new sock 302 will be clamped against the previously accumulated socks 304 by the bumper 306, and the swing clamp 298 will swing about a pivot 308 against the bias of a spring 310 (FIGURE 18) to permit the upper edge of the sock 302 to pass under the lower edge portion of the intermediate clamp 294. It will also be observed from view *f* that the front gripper 292 has changed its spacing with respect to the intermediate gripper 294. The front gripper 292 is always urged rearwardly by spring means, and in this portion of the cycle, it follows the movements of the bumper 306 on the swing clamp 298 rather than the movements of the intermediate clamp 294.

Further forward movement of the swing clamp 298 serves to position the parts as shown in view *g*. Here, it will be observed that the sock 302 has completely cleared the intermediate gripper 294 and that the swing clamp 298 has undergone a return swinging movement about its pivot 308. The return swinging movement of the swing clamp 298 flips the upper edge portion of the sock 302 into face-to-face engagement with the already accumulated socks 304, and at this time, the sock 302 becomes a part of the bundle.

The cycle is completed by returning the sock contacting components from the positions shown in view *g* to those shown in view *a*. During the initial portion of the rearward movement of the swing clamp 298, the bundle of socks is held between the swing clamp and the front gripper 292. Then, as the swing clamp 298 passes the intermediate gripper 294, the rearmost sock of the bundle is brought into engagement with the front face of the intermediate gripper 294. Upon further rearward movement of the swing clamp, the bundle of socks will be gripped between the front gripper 292 and the intermediate gripper 294, and the swing clamp is freed of its sock holding functions so that it may return to the position shown in view *a*.

Turning now to FIGURES 18 through 22, the structural features of the sock contacting components of the mechanism 34 and the means by which these components are mounted and driven will be explained in detail.

The front gripper 292 (FIGS. 18, 19 and 20) is in the form of a plate 312, the lower edge portion of which has an undulating configuration 314. A gripper pad 316 of similar configuration is attached to the rear face of the lower end portion of the plate 312. The illustrated shape of the lower portion of the front gripper 292 is advantageous in that it facilitates grasping of the accumulated socks 304 by the operator when the operator desires to remove a bundle of socks.

The plate 312 is attached by screw means 318 to the ends of a pair of rods 320 mounted for longitudinal sliding movement within guide cylinders 322 fixed on frame parts 300 and 324. A pair of tension spring 326 are provided for urging the plate 312 rearwardly at all times. Each of these tension springs 326 is connected at its rear end to a stationary frame part 328 and at its front end to the plate 312.

The intermediate gripper 294 also is in the form of a plate 330 having a pad of resilient material 332 affixed to its rear face. This plate 330 is affixed to the front end portions of rods 334 mounted in frame parts 300, 324 and 336 for longitudinal reciprocation relative thereto. A collar 338 is secured to each of the rods 334, and compression springs 340 surround the respective rods 334 in the zone between the collars 338 and the frame part 336 to urge the rods rearwardly at all times.

The rearwardly directed force of the springs 340 may be counteracted by a cam 342 mounted on a driven shaft 344. The circumferential edge of the cam 342 contacts a cam follower 346 mounted on a bar 348 fixed to the rear ends of the rods 334. In FIGURE 19, the cam 342 is shown in a position which results in displacement of the cam follower 346 to the right. Upon continued rotation of the driven shaft 344, movement of the cam follower 346 to the left, under the influence of the springs 340, will occur.

The rear gripper 296 is attached to rods 350 mounted for longitudinal reciprocating movement with respect to the stationary frame parts 300 and 336. A rack 352 on the upper surface of each of the rods 350 meshes with a small gear 354 which is in turn driven by a rack 356 carried by the adjacent rod 334 (FIGURES 19 and 21). Both of the gears 354 are mounted on a single shaft 358 rotatable in stationary bearing means 360 carried by the frame. Thus, the rods 334 and 350, respectively carrying the intermediate and rear grippers 294 and 296, are coupled together at all times, so that movement of the intermediate gripper 294 in one direction will be accompanied by an equal movement of the rear gripper 296 in the opposite direction.

Figure 22:
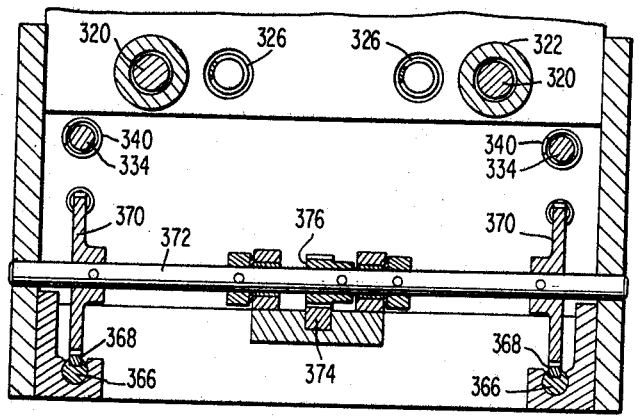
FIGURE 22 is a cross-sectional view taken along the line 22—22 in FIGURE 19.
Figure 18:
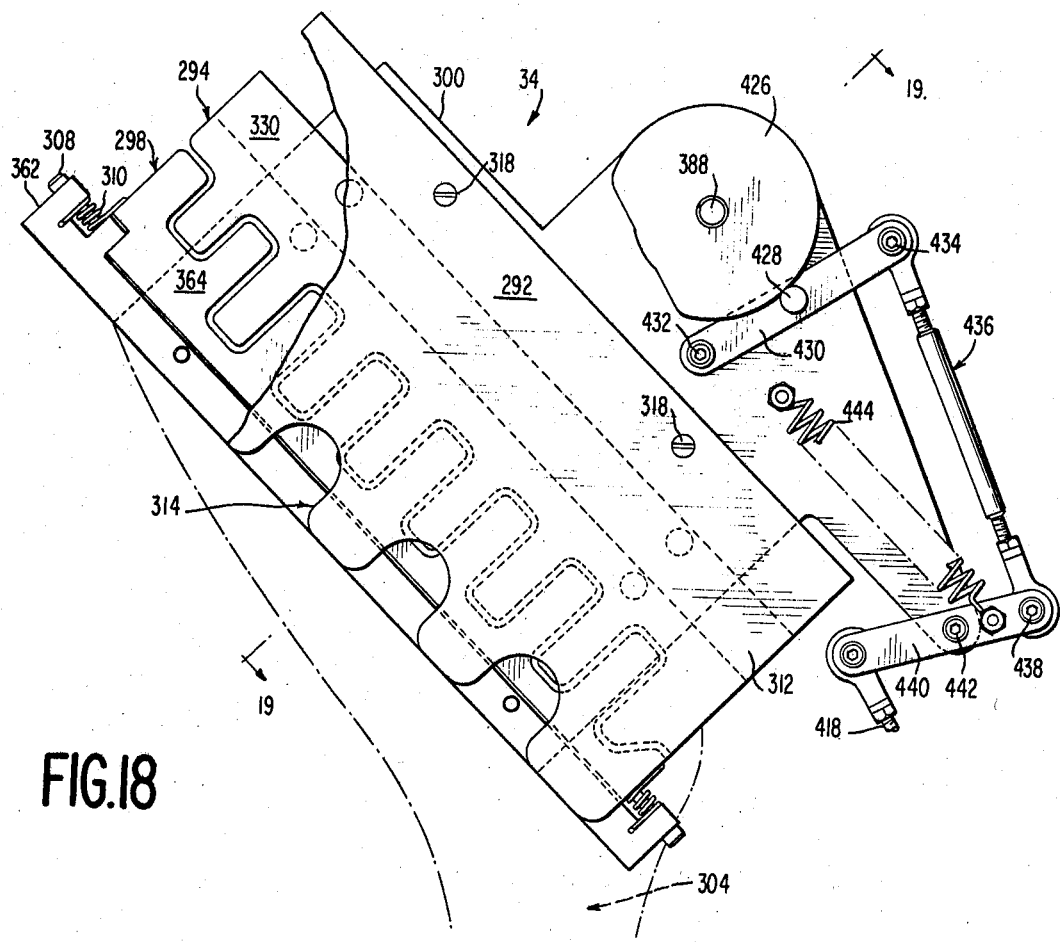
FIGURE 18 is an enlarged front elevational view, with parts broken away, of the stocking gripping mechanism shown at the upper left portion of FIGURE 1.

The swing clamp 298 is made up of a lower portion or substructure 362 carrying the bumper pad 306 on its front face and having an upper plate structure 364 pivoted thereto as shown in FIGURE 18. The sub-structure 362 is fixed to the front ends of two rods 366 reciprocably mounted on the frame and carrying racks 368. Each of the racks 368 meshes with a gear 370 fixed on a rotating cross shaft 372 (FIG. 22). This cross shaft 372 is driven by a rack 374 meshing with a centrally located gear 376 on the shaft. The rack 374 is on a longitudinally reciprocable bar 378 having a cam follower 380 at its rear end. The cam follower 380 rides in a cam groove 382 formed in the face of a cam plate 384 attached to the driven shaft 344, so that upon rotation of the shaft 344, the rack 374 will be moved back and forth to oscillate across shaft 372 and to reciprocate the rods 366 carrying the swing clamp 298.

Power for continuously rotating the shaft 344 is supplied through a gear 386 fixed on a rotatable shaft 388 and meshing with a gear 390 on the end of the shaft 344 (FIG. 19). The gear 386 is in turn driven from the vertically extending shaft 68 (FIG. 4) through means illustrated at the upper portion of FIGURE 1. The shaft 68 leads to a gearbox 392 the output from which is coupled through means 394 to a shaft 396, and the end of the shaft 396 carries a gear 398 meshing with the gear 386.

The rotation of the shaft 388 carrying the gear 386 also serves to control the operation of the device 36 which assures the complete separation of the leg portion of each sock from its form as the form recedes along the incline 30. The construction of this device is best illustrated in FIGURES 24 through 27, and attention should now be directed to these views.

The sock contacting components of the device 36 are two rollers 400 and 402 which are continuously rotated in opposite directions, and which may be swung toward and away from the path of a boarding form 8 moving along the incline 30. As the boarding form 8 moves upwardly along the incline 30, the rollers 400 and 402 are spaced apart from each other, and neither of them contacts the boarding form or the sock carried thereby. Then, as the boarding form moves back down along the incline 30, the rollers 400 and 402 are moved together to contact the leg portion of the sock and to urge the sock off the toe end of the boarding form.

The roller 400 is fixed on a shaft 404 carried by links 406 pivotally mounted at 408 on a stationary frame part 410. Similarly, the roller 402 is fixed on a shaft 412 carried by links 414 pivoted at 416 to the frame part 410.

Movement of the roller shafts 404 and 412 relative to each other is brought about by the means shown in FIGURE 27. A reciprocable rod 418 is pivotally connected to the ends of two links 420 and 422 by a pin 424. The roller shaft 404 is rotatable within an opposite end of the link 420, and the roller shaft 412 is rotatable in an opposite end portion of the link 422. As the rod 418 is moved to the left in FIGURE 27, the pin 424 will carry the proximate ends of the links 420 and 422 to the left, causing the shafts 404 and 412 to move away from each other. This effect is indicated by the broken line representations of the rollers 400 and 402 in FIGURE 25.

Reciprocation of the shaft 418 in timed relation to the other operations of the machine is accomplished by coupling the rod 218 to the shaft 388 of the gripper mechanism 34. Referring to FIGURES 18 and 19, it will be seen that the shaft 388 has a cam 426 affixed to its front end portion and the rod 418 is connected through linkage means to a cam follower 428 bearing against the surface of this cam 426.

The linkage means comprises a link 430 pivotally connected to a stationary frame part at 432 and having the cam follower 428 mounted thereon. The opposite end of the link 420 is pivoted at 423 to a linkage component 436, the length of which is adjustable. The opposite end of the component 436 is pivotally connected at 438 to a link 440. This link 440 is pivotally mounted on the frame at 442 and is connected at its opposite end to the rod 418. A tension spring 444 is connected to the link 442 to bias the linkage mechanism in such a direction as to assure continuing contact between the cam follower 428 and the surface of the cam 426.

A small motor 446 serves to rotate the rollers 400 and 402 of the device 36. Belt-and-pulley means 448 connect the output shaft of the motor 446 to a driven shaft 450, the axis of which is coincident with the pivot axis 408 about which the link 406 moves as the roller 400 is swung toward and away from the path of the boarding form. The shaft 450 carries a gear 452 which meshes with a gear 454 on the roller shaft 404.

Another gear 456 is mounted for rotation about an axis coincident with the pivot axis 416 about which the roller 402 swings. This gear meshes with a gear 458 on the roller shaft 412 and also meshes with the driven gear 452. With this arrangement, the meshing of the various gears is not affected by the swinging movements imparted to the rollers 400 and 402, and the rollers are rotated continuously in opposite directions.

From this detailed description of the various machine components and their relationships to each other, the manner in which these components cooperate in carrying out the operations discussed generally in connection with FIGURES 1 through 2D will now be apparent without further elaboration. These operations are carried out automatically and reliably, leaving the machine operator free to give full attention to the tasks of placing socks on the empty boarding forms and of periodically removing bundles of finished socks from the machine. Moreover, the compact arrangement of the loading zone and the stocking gripping mechanism, together with the pacing effect achieved by the manner in which the empty forms are moved stepwise into and out of the loading zone, serve to enhance the quality and efficiency of the operator's performance.

Although a single embodiment has been illustrated and described in detail, it will be evident to persons skilled in the art that modifications and variations may be made without departing from the true spirit and scope of the invention. Additionally, the improved components here described may be used in other and different machines. For example, the novel stocking gripping mechanism 34 can be used to advantage in machines of the type described in my prior patent. Hence, it should be understood that the foregoing detailed description of the illustrated embodiment is to be considered as exemplary only.

What is claimed is:

1. Hosiery boarding apparatus comprising:
    an elongated treatment chamber having a front end wall provided with laterally spaced-apart inlet and outlet openings;

a plurality of generally flat hosiery boarding forms positioned at all times in planes substantially parallel to said front end wall of said chamber;

a first guideway extending longitudinally to the rear of the interior of said chamber in alignment with said inlet opening;

a second guideway extending longitudinally to the front of the interior of said chamber in alignment with said outlet opening;

means for moving a line of said boarding forms rearwardly along said first guideway in side-by-side relation and for moving another line of said boarding forms forwardly along said second guideway in side by side relation;

means for transferring boarding forms laterally from said first guideway to said second guideway at the rear ends thereof; and means in front of said chamber for recycling the boarding forms emerging from said outlet opening back into said inlet opening.

2. The apparatus of claim 1 wherein said means for recycling the boarding forms positions each of the boarding forms at a loading station for a predetermined time interval prior to the return of the form into the inlet opening.

3. The apparatus of claim 2 including means cooperating with each of said boarding forms after its emergence from said outlet opening and prior to its delivery to said loading station to remove the hosiery therefrom.

4. The apparatus of claim 3 wherein each of said boarding forms includes a vertically extending leg portion and a laterally projecting foot portion at the upper end of the leg portion terminating in a toe portion, wherein the foot portion of all of said forms project laterally in the same direction, and wherein means are provided for transferring each boarding form laterally in said direction to a hosiery removal station after it emerges from said outlet opening and then returning such form from said station in the opposite direction.

5. The apparatus of claim 1 including means for circulating treating fluid downwardly across the boarding forms on one of said guideways and upwardly across the boarding forms on the other of said guideways.

6. The apparatus of claim 5 wherein said circulating means includes an air blower and wherein heater means are disposed in the air flow path both above said one guideway and below said other guideway.

7. A hosiery boarding machine comprising:
a plurality of boarding form carriers;
hosiery boarding forms detachably connected respectively to said carriers;
an elongated treatment chamber having a front end wall provided with laterally and vertically spaced-apart inlet and outlet openings;
a lower track extending to the rear of the interior of said chamber from said inlet opening and slidably receiving a series of said form carriers;
an upper track extending from the rear of the interior of said chamber to said outlet opening and slidably receiving a series of said form carriers;
a shuttle slide having a carrier receiving pocket and being mounted for movement in front of said front chamber wall along an inclined path extending upwardly and laterally from said outlet opening in a direction away from said inlet opening;
a stocking gripping mechanism disposed above the end of the shuttle slide path remote from said outlet opening for cooperation with a stocking on a boarding form mounted on a form carrier supported by said shuttle slide;
a front transfer slide having a carrier receiving pocket and being mounted for movement in front of said shuttle slide along an inclined path extending from said outlet opening to said inlet opening;

a rear transfer slide having a carrier receiving pocket and being mounted in a rear portion of said chamber for movement along an inclined path extending from the rear end of said lower track to the rear end of said upper track;

means for moving said slides back and forth intermittently along their respective paths in timed relation between first positions of rest in which the pockets of all of said slides are in alignment with said upper track and second positions of rest in which the pockets of said transfer slides are in alignment with said lower track and the pocket of said shuttle slide is beneath said gripping mechanism;

and pusher means operating when said slides are in said first positions of rest to shift all the form carriers in alignment with said upper track forwardly a distance equal to the length of one form carrier and operating when said slides are in said second positions of rest to shift all the form carriers in alignment with said lower track rearwardly a distance equal to the length of one form carrier.

8. A machine according to claim 7 additionally including latching means for preventing rebound movements of the form carriers after operations of said pusher means.

9. A machine according to claim 7 additionally including a pair of driven rollers movably mounted on opposite sides of the path followed by a boarding form on said shuttle slide, and means for moving said rollers toward and away from such path in timed relation to the movements of said shuttle slide so that said rollers contact portions of a stocking on the boarding form as the form moves away from the gripping mechanism to assure complete removal of such stocking from the form.

10. A machine according to claim 7 wherein said stocking gripping mechanism includes means for contacting opposite sides of the foot portion of a stocking carried by a boarding form on said shuttle slide to hold the foot portion of the stocking stationary while such boarding form is being moved away from said mechanism.

11. A machine according to claim 9 wherein said stocking gripping mechanism includes means for contacting opposite sides of a bundle of boarded stockings to hold the stockings in side by side relation by the foot portions thereof and wherein means are provided for adding additional stockings one at a time to the bundle as such additional stockings are removed from their respective boarding forms.

12. In hosiery boarding apparatus including a plurality of generally flat hosiery boarding forms and a stocking gripping mechanism for automatically removing a stocking from each of said forms upon relative motion between such form and said mechanism in a direction to pass the stocking off the free toe end of the boarding form, an improved stocking gripping mechanism comprising:

a first gripper having a rear face portion for contacting the front side of the foot portion of a stocking on the boarding form and a front face portion for contacting the rear side of the foot portion of a stocking which has already been removed from its boarding form;

a second gripper in front of said first gripper having a rear face portion for contacting the front side of the foot portion of a stocking after the stocking has been removed from its boarding form;

a clamp having
a lower portion movable back and forth along a path beneath said first gripper and having a surface for contacting the rear side of the foot portion of a stocking as the latter is being removed from its boarding form,
an upper portion pivotally connected to said lower portion to permit said upper portion to swing about the pivot axis as the lower portion passes forwardly beneath said first clamp, and spring means for swinging said upper portion to an upright position after said upper portion has cleared the lower edge of said first clamps; and means for driving said clamp to move said lower portion thereof back and forth along said path to first grip the stocking being removed from its form between said clamp and said first gripper and then pass the foot portion of such stocking beneath the lower edge of said first gripper into face to face contact with a stocking previously removed from its form and held against said second gripper.

13. Apparatus according to claim 12 wherein the lower edge of said first gripper and the upper edge of said upper portion of said clamp have undulating configurations which are out of phase with each other to permit the upper portion of said clamp to move rearwardly beneath said first gripper in an upright position.

14. Apparatus according to claim 12 additionally including spring means for continuously biasing said second gripper in a rearwardly direction so that forces for supporting the stockings already removed from their forms will be applied against either said clamp or said first gripper depending upon the relative positions of such elements.

15. Apparatus according to claim 12 additionally including:

a third gripper rearwardly of said first gripper and above said clamp; and means for moving said first and third grippers toward and away from each other to alternately grip and release the foot portion of a stocking on a boarding form.

References Cited

UNITED STATES PATENTS

| | | | |
|---|---|---|---|
| 1,439,702 | 12/1922 | Haseltine | 34—103 X |
| 1,504,731 | 8/1924 | Wigglesworth et al. | 34—103 |
| 1,660,312 | 2/1928 | Allsop et al. | 34—103 |
| 3,054,542 | 9/1962 | Glaze et al. | 223—112 |
| 3,319,851 | 5/1967 | Horberg | 223—112 |
| 3,353,726 | 11/1967 | Kronsbein | 223—112 |
| 3,355,074 | 11/1967 | Brewin et al. | 223—112 |

MERVIN STEIN, Primary Examiner

GEORGE V. LARKIN, Assistant Examiner

U.S. Cl. X.R.

223—112